(12) United States Patent
Bender et al.

(10) Patent No.: US 6,767,463 B1
(45) Date of Patent: Jul. 27, 2004

(54) METHOD FOR MINIMIZING THE NEW WATER USE IN THE WATER CIRCULATION SYSTEM OF A TREATMENT PLANT

(75) Inventors: Martin Bender, Aachen (DE); Michael Langen, Aachen (DE); Jorg Wolters, Aachen (DE)

(73) Assignee: Der Grune Punkt-Duales System Deutschland AG, Cologne (DE)

( * ) Notice: Subject to any disclaimer, the term of this patent is extended or adjusted under 35 U.S.C. 154(b) by 120 days.

(21) Appl. No.: 10/089,286

(22) PCT Filed: Sep. 26, 2000

(86) PCT No.: PCT/DE00/03363

§ 371 (c)(1),
(2), (4) Date: Sep. 13, 2002

(87) PCT Pub. No.: WO01/27383

PCT Pub. Date: Apr. 19, 2001

(30) Foreign Application Priority Data

Oct. 12, 1999 (DE) .......................... 199 49 265

(51) Int. Cl.$^7$ ................................. C02F 3/00
(52) U.S. Cl. ................ 210/607; 210/608; 210/609; 210/631; 210/723; 210/787
(58) Field of Search ................ 210/723, 607, 210/608, 631, 787, 609

(56) References Cited

U.S. PATENT DOCUMENTS

| | | | |
|---|---|---|---|
| 5,100,066 A | 3/1992 | Frei ............................. | 241/21 |
| 5,137,599 A | 8/1992 | Maxham ........................ | 162/5 |
| 5,417,806 A | 5/1995 | Matzke et al. ................. | 162/4 |

FOREIGN PATENT DOCUMENTS

| | | | |
|---|---|---|---|
| DE | 196 44 437 | 4/1998 | ............ B03B/9/06 |
| DE | 197 55 527 | 6/1999 | ............ C02F/3/32 |
| EP | 0 570 757 | 11/1993 | ............ D21B/1/02 |
| EP | 0 751 253 | 1/1997 | ............ D21B/1/32 |
| WO | 99/01612 | 1/1999 | ............ D21G/9/00 |

OTHER PUBLICATIONS

Stetter, A. et al: "Erfahrungen mit Messund Regelanllagen im Kreislauf der Altpapieraufbereitung" Wochenbl. Papierfabr. 121, NR. 23/24: 1018–1023 (Dec. 15, 1993), XP002084075 siehe das ganze Dokument.
Copy of International Search Report.

*Primary Examiner*—Chester T. Barry
(74) *Attorney, Agent, or Firm*—Shaw Pittman LLP

(57) ABSTRACT

A system and method for minimizing new water use in the water circulation system of a treatment plant in which the matter to be treated is purified and/or disaggregated using water in a treatment step. The suspension containing the remaining components is subjected to mechanical purification and the mechanically purified suspension is separated into two processing water streams. The first processing water stream is supplied back into the treatment step and the second processing water stream is subjected to a chemical-physical clarification. The chemically-physically clarified processing water stream is separated into two clarified water streams. The first clarified water stream is led into one of the two processing water streams and/or into the suspension and the second clarified water stream is subjected to a biological clarification. The biologically clarified water stream, being a fresh water stream, is led into one or two clarified water streams. The ratio of the processing water streams to the clarified water streams has been predetermined depending on the matter that is supplied to the treatment step and on the type of mechanical purification and the type of chemical-physical clarification used.

26 Claims, 1 Drawing Sheet

METHOD FOR MINIMIZING THE NEW WATER USE IN THE WATER CIRCULATION SYSTEM OF A TREATMENT PLANT

BACKGROUND

1. Field of the Invention

The present invention relates generally to a system and method for minimizing new water use in the circulation system of a treatment plant.

2. Background of the Invention

Many purification and separation processes are performed wet, in other words with the introduction of water to function as the carrier of pollutants and interfering substances as well as for the recyclable fraction. If no other measures are taken, the concentration of pollutants and interfering substances quickly rises rendering, for example, purification processes ineffective. Pollutants and interfering substances can also impair the sequence of operations during purification or separation or during subsequent treatment operations. Therefore, it is necessary to limit the amount of pollutants and interfering substances as much as possible. It is to this end that new water is introduced into the water circulation system.

A regulating process for minimizing water use in a water circulation system of a paper, cellulose or wood plant is disclosed in WO 99/01612. Here, the concentration of interfering substances is regulated either in a paper machine circuit and/or in a filtering circuit, preferably in the final filtering circuit, whereupon the interfering substance removal and also the new water input are regulated. Sensors that record certain parameters that measure the interfering substance concentration have been placed in suitable locations in the water circulation system. This includes the assessment of, in particular, turbidity and cationic requirements.

The use of sensors should be avoided since they are susceptible to interference.

It is an object of the present invention to provide a process of the type mentioned above, which allows minimizing new water use without unduly letting the interfering substance concentration rise.

SUMMARY OF THE INVENTION

The invention provides a method for minimizing new water use in the water circulation system of a treatment plant in which, a) the matter to be treated is purified and/or disaggregated in a treatment step using water separating the matter to be treated into different components that are not necessarily of the same variety, at least one of which components is removed from the treatment step;

b) the suspension containing the remaining components is subjected to mechanical purification whereby solid parts with dimensions that exceed a specific threshold value are removed from the suspension;

c) the mechanically purified suspension is separated into a first processing water stream and a second processing water stream;

c-1) whereby the first processing water stream is led back to the treatment step; and c-2) the second processing water stream is subjected to a chemical-physical clarification;

d) the chemically-physically clarified processing water stream is separated into a first clarified water stream and a second clarified water stream, d-1) whereby the first clarified water stream is led into the first and/or the second processing water stream and/or into the suspension and d-2) subjecting the second clarified water stream to a biological clarification; and e) the clarified water stream that was biologically clarified, being a fresh water stream, is led into the first and/or second clarified water stream, whereby the ratio of the first processing water stream to the second processing water stream and of the first clarified water stream to the second clarified water stream has been pre-determined depending on the matter that is supplied to the treatment step and on the type of mechanical purification and on the type of chemical-physical clarification used and the water circulation system is basically closed so new water is introduced only when the concentration of dissolved organic and inorganic particles exceeds a specific threshold value.

The invention takes advantage of the fact that the composition of the waste to be treated is known and remains reasonably constant so that certain pollutants and interfering substances effectively can be removed from the water circulation system avoiding constant new water requirement. This is particularly the case with waste similar to waste collected from the Gelben Sack [yellow bag] or the Gelben Tonne [yellow barrel] container, which is collected in Germany by the Dualen System and which is regularly pre-sorted before being subjected to wet separation. Wet separation is generally used for light packaging waste such as plastics, aluminums, cardboard foil composites, paper composites and other composite materials that still contain pollutants and interfering substances when they have been treated, for example, in accordance with the method described in WO 98/18607 in such a manner that metallic substances and certain plastics no longer are suitable for wet separation. In the clarification steps according to embodiments of the invention, pollutants and interfering substances can be effectively removed from the water circulation system. It has been shown that it is not necessary to continually examine the fresh water but that examination at longer but regular intervals, approximately every two weeks, suffice to identify a possible increase in concentration. Purification and separation processes remain consistent since water purification, according to embodiments of the method of the invention, also can be adjusted to treat more polluted materials.

Paper separation plays an essential role when treating light packaging waste and simply completely, if possible, removing paper fibers from the water circulation system can purify the water.

Additionally, an implementation of the method allows the following steps to occur during mechanical purification after step b) either alone or in combination:

b-1) Sieving of the suspension; preferably using a sieve having a mesh size of 2 to 6 mm and preferably having a mesh size of 4 mm. Sieving facilitates segregation of coarse organic pollutants such as plastic fragments.

b-2) Leading of the suspension through a hydro cyclone containing the heavy matter in the underflow and all other components in the overflow. In the case of light packaging waste, the suspension would contain mainly paper fibers whereby inorganic heavy pollutants are removed from the hydro cyclone in the underflow. The overflow still contains the paper fibers as well as organic fine pollutants.

b-3) Filtration of the suspension preferably using a filter having an approximate mesh size of 150 $\mu$m. The mesh size is then sized to fit the size of the parts that have to be withheld. The indicated size effectively separates the paper fibers. The paper fibers remain on the filter and can be used later for example in a paper recycling plant.

Another implementation of the method allows the implementation of the following steps either alone or in combination during the chemical-physical clarification according to step c-2):

c-2-1) addition of water purification chemicals in one and/or two steps, for example, precipitation agents and/or flocculants. Subsequent doses of, for example, cationic-actives and anion-actives could be added. Dual flocculation is recommended if high purity of the liquid phase to be separated is required.

c-2-2) separation of the flocculated pollutants from the purified water using flotation and/or sedimentation and removal of floating solids or deposited sediment or removal of the clarified water located in between them.

Biological clarification usually occurs in municipal sewage works.

Water treatment remains in the forefront of the method according to embodiments of the invention, not the production of paper fibers.

DETAILED DESCRIPTION OF THE INVENTION

Preferred embodiments of the invention will be described in greater detail with reference to the drawings. In the example below it is assumed that the matter to be treated has been collected from, for example, recycling containers (similar to the Dualen System Gelben Sack [yellow bags] or Gelben Tonne [yellow barrel] containers used in Germany), and has been prepared so that metallic and non-metallic recyclable fractions have at least partially been sorted in corresponding sorting and separation processes. Light packaging waste, such as plastics, aluminums, cardboard foil composites, paper composites, and other composite materials that are polluted by remaining food particles, sand, plastic splinters, small metal pieces, and such, are treated last.

Figure 1:
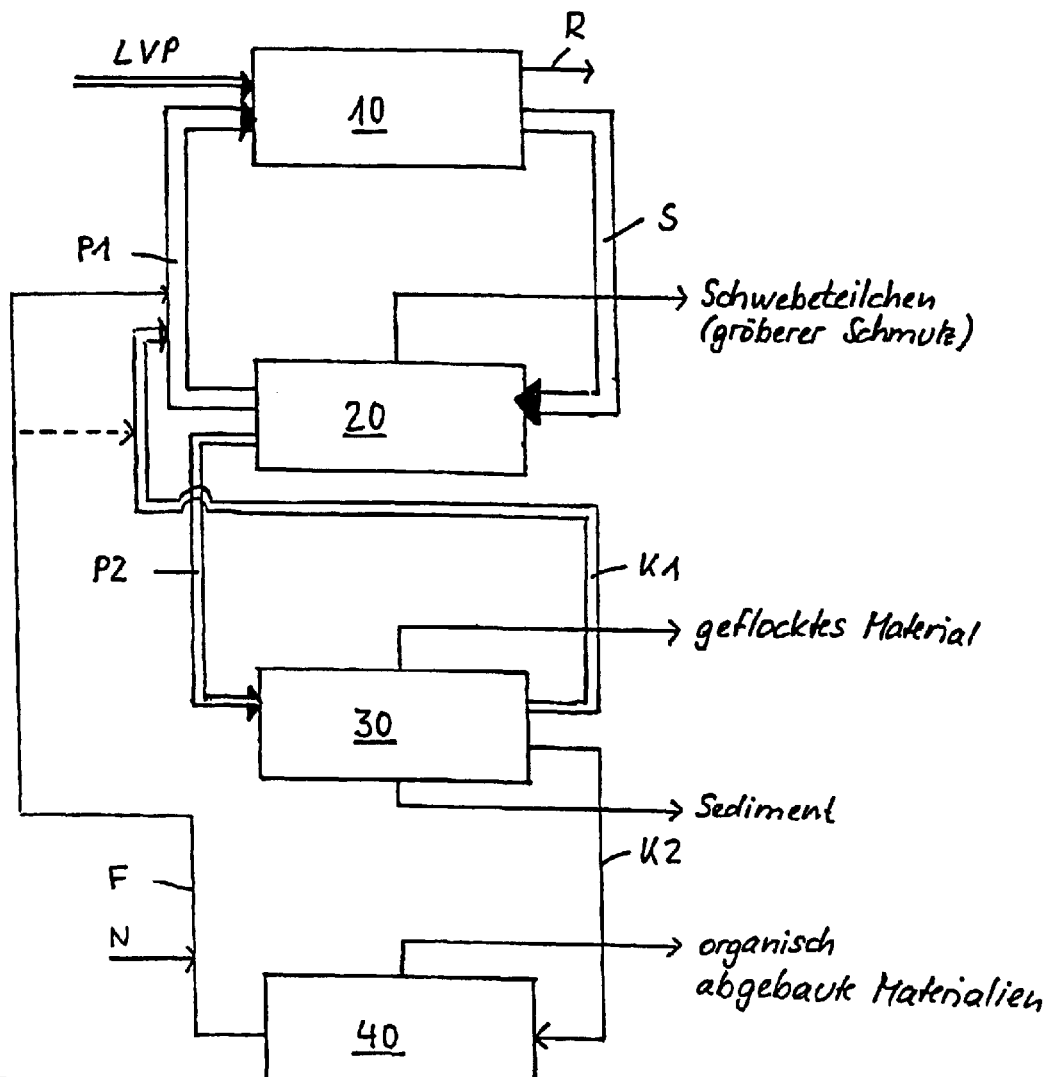
FIG. 1 shows a water circulation system in a treatment plant for light packaging waste, according to an embodiment of the present invention.

Collectively, the light packaging waste is denoted with "LVP" and, in accordance with FIG. 1, is introduced to treatment step 10 where it is purified and disaggregated using water. Treatment step 10 could, for example, be a pulper in which the paper fibers are dissolved by agitation. Heavy interfering substances such as stones and metals will sink to the bottom of the pulper and can be removed from there as the remainder (R). A suspension (S) is discharged from treatment step 10 and is subjected to a mechanical purification 20 that removes as many of the floating parts (coarser pollutants) in the suspension as possible. The mechanical purification is described in further detail in FIG. 2. The mechanically purified suspension is divided into two processing water streams P1 and P2 that are still cloudy. The first processing water stream P1 is returned to treatment step 10 and the second processing water stream P2 is subjected to the chemical-physical clarification 30. The ratio of the first processing water stream P1 to the second processing water stream P2 has been predetermined. Structurally, this ratio is expressed by choosing a corresponding pipe diameter for the water pipe.

The chemical-physical clarification 30 causes an extensive solid part/liquid separation in accordance with known measures such as flocculation that removes flocculated matter and/or sediment. The chemically-physically clarified processing water is then divided into two clear water streams K1, K2. The first clear water stream K1 can be re-introduced into the subsequent process at different locations, for example, into the suspension S but if the process requires it, also into the first processing water stream P1, as is shown in FIG. 1 or even into the second processing water stream P2. The appropriate connection position is chosen depending on processing conditions. In this case, too, the ratio of the first clear water stream K1 to the second clear water stream P2 has been predetermined and is expressed by choosing corresponding pipe diameters. The second clear water stream K2 is subjected to a biological clarification 40 from which it is extracted as fresh water F which is now also cleaned through organic stripping. This fresh water F can also be introduced at different locations in the subsequent process. FIG. 1 shows the introduction into the first processing water stream P1 which could occur directly or indirectly via the first clear water stream K1.

Consistent process management is essential in this connection. Should a test removal reveal that a concentration of dissolved organic and inorganic substances has exceeded a predetermined threshold value that is usually set by the municipal officials, new water N is fed to the water circulation system, in this case to the fresh water stream F. This would only occur in exceptional circumstances since the special purification and clarification that has been adjusted to suit the matter to be treated will prevent an unacceptable increase in concentration.

Figure 2:
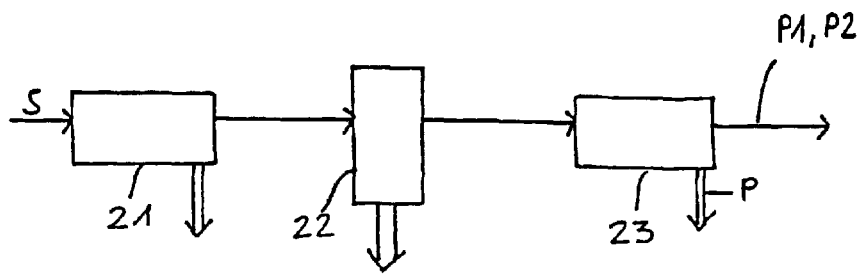
FIG. 2 shows a schematic view of the details of the mechanical purification, according to an embodiment of the present invention.

FIG. 2 shows the details of the mechanical purification. The suspension (S) (FIG. 1) discharged from treatment step 10 is led over a sieve 21 that has a relatively large mesh size, for example, 4 mm. Plastic particles and other large pollutants are segregated here. The suspension, which in this case still contains the paper fibers and fine pollutants, is led into a hydro cyclone 22 where, as usual, heavy matter separation occurs in the underflow. The overflow still contains the paper fibers. In particular, heavy inorganic pollutants such as sand are segregated in the underflow.

The paper fiber suspension is placed in a filtering system 23 which could, for example, consist of several toroidal-shaped filters that are series-connected and have a mesh size of 150 $\mu$m. The paper fibers remain on the filters and can be re-used in paper recycling plants. Processing water streams P1, P2 are led to treatment step 10 or to chemical-physical clarification 30 (FIG. 1).

The invention specifications disclosed above and in the drawings as well as in the patent claims could be significant both individually and in any chosen combination for the different implementations of the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for minimizing new water use in the water circulation system of a plant for treating matter wherein:
   (a) the matter to be treated is at least one of purified and disaggregated in a cleaning step using water, separating the matter to be treated into different components that are not necessarily of the same variety, of which at least one component is removed during the cleaning step;
   (b) the suspension containing the remaining components undergoes a mechanical purification whereby solid particles with dimensions that exceed a specific threshold value are removed from the suspension;
   (c) the mechanically purified suspension is separated into a first processing water stream and a second processing water stream,
      c-1) wherein the first processing water stream is re-circulated by being led back and added to the water used in step (a), and
      c-2) the second processing water stream is subjected to a chemical-physical clarification;
   (d) the chemically-physically clarified processing water stream is separated into a first clarified water stream and a second clarified water stream,
      d-1) wherein the first clarified water stream is led into at least one of the first processing water stream, the second processing water stream, and the suspension, and
      d-2) the second clarified water stream is subjected to a biological clarification; and
   (e) the biologically clarified water stream, being a fresh water stream, is led into at least one of the first and the second clarified water stream,
   whereby the ratio of the first processing water stream to the second processing water stream and of the first clarified water stream to the second clarified water stream has been predetermined depending on the matter that is supplied to step (a) and on the type of mechanical purification and on the type of chemical-physical clarification used, such that the water circulation system is basically closed and new water is only added when the concentration of dissolved organic and inorganic parts exceeds a specific threshold value.

2. The method of claim 1, wherein in step (b) the suspension is sieved.

3. The method of claim 2, wherein in step (b), the suspension is led through a hydro cyclone such that heavy matter is contained in an underflow and all other components are contained in an overflow.

4. The method of claim 1, wherein in step (b), the suspension is led through a hydro cyclone such that heavy matter is contained in an underflow and all other components are contained in an overflow.

5. The method of claim 4, wherein in step (b), the suspension is filtered.

6. The method of claim 3, wherein in step (b), the suspension is filtered.

7. The method of claim 2, wherein in step (b), the suspension is filtered.

8. The method of claim 1, wherein in step (b), the suspension is filtered.

9. The method of one of claims 1 to 8, wherein step c-2) comprises the addition of water purification chemicals.

10. The method of claim 9, wherein the water purification chemicals are added in one of one stage and two stages.

11. The method of one of claim 1 to 8, wherein step c-2) comprises the separation of flocculated pollutants from the clarified water using at least one of flotation and sedimentation.

12. The method of claim 11, wherein at the end of the separation of flocculated pollutants, the flocculated pollutants are drained using at least one of pressure draining and centrifugal drainage.

13. A method for minimizing new water use in the water circulation system of a plant for treating matter wherein:
   (a) the matter to be treated is at least one of purified and disaggregated in a cleaning step using water, separating the matter to be treated into different components that are not necessarily of the same variety, of which at least one component is removed during the cleaning step;
   (b) the suspension containing the remaining components undergoes a mechanical purification whereby solid particles with dimensions that exceed a specific threshold value are removed from the suspension;
   (c) the mechanically purified suspension is separated into a first processing water stream and a second processing water stream,
      c-1) wherein the first processing water stream is re-circulated by being led back and added to the water used in step (a), and
      c-2) the second processing water stream is subjected to a chemical-physical clarification;
   (d) the chemically-physically clarified processing water stream is separated into a first clarified water stream and a second clarified water stream,
      d-1) wherein the first clarified water stream is led into at least one of the first processing water stream, the second processing water stream, and the suspension, and
      d-2) the second clarified water stream is subjected to a biological clarification; and
   (e) the biologically clarified water stream, being a fresh water stream, is led into at least one of the first and the second clarified water stream,
   whereby the ratio of the first processing water stream to the second processing water stream and of the first clarified water stream to the second clarified water stream has been predetermined depending on the matter that is supplied to step (a) and on the type of mechanical purification and on the type of chemical-physical clarification used, such that the water circulation system is basically closed and new water is only added when the concentration of dissolved organic and inorganic parts exceeds a specific threshold value, and wherein step c-2) comprises the addition of water purification chemicals, and wherein the water purification chemicals are added in one of one stage and two stages.

14. The method of claim 13, wherein step c-2) includes the separation of the flocculated pollutants from the clarified water using at least one of flotation and sedimentation.

15. The method of claim 14, wherein at the end of the separation of flocculated pollutants, the flocculated pollutants are drained using at least one of pressure draining and centrifugal drainage.

16. A method for minimizing new water use in the water circulation system of a plant for treating matter in which:
(a) the matter to be treated is at least one of purified and disaggregated in a disaggregating and washing step using water, separating the matter to be treated into different components that are not necessarily of the same variety, of which at least one component is removed from the disaggregating and cleaning step;
(b) the suspension containing the remaining components undergoes a mechanical purification whereby solid parts with dimensions that exceed a specific threshold value are removed from the suspension;
(c) the mechanically purified suspension is separated into a first processing water stream and a second processing water stream,
   c-1) the first processing water stream is led back and added to the water used in step (a), and
   c-2) the second processing water stream is subjected to a chemical-physical clarification by at least one of the following means:
      c-2-1) addition of water purification chemicals, and
      c-2-2) separation of the flocculated pollutants from the clarified water using flotation and/or sedimentation;
(d) the chemically-physically clarified processing water stream is separated into a first clarified water stream and a second clarified water stream,
   d-1) wherein the first clarified water stream is led into at least one of the first processing water stream, the second processing water stream, and the suspension, and
   d-2) the second clarified water stream is subjected to a biological clarification; and
(e) the biologically clarified water stream, being a fresh water stream, is led into at least one of the first and the second clarified water stream,
whereby the ratio of the first processing water stream to the second processing water stream and of the first clarified water stream to the second clarified water stream has been predetermined by choosing a pipe diameter that corresponds to the amount of water that needs to flow through, and depending on the matter that is supplied to step (a) and on the type of mechanical purification and chemical-physical clarification used, and wherein the water circulation system is basically closed so that new water is only added when the concentration of dissolved organic and inorganic particles exceeds a specific threshold value.

17. The method of claim 16, wherein sieving occurs in step (b).

18. The method of claim 17, wherein in step (b), the suspension is led through a hydro cyclone whereby heavy ratter is contained in an underflow and all other components are contained in an overflow.

19. The method of claim 16, wherein in step (b), the suspension is led through a hydro cyclone whereby heavy Tatter is contained in an underflow and all other components are contained in an overflow.

20. The method of claim 19, wherein the suspension is filtered in step (b).

21. The method of claim 18, wherein the suspension is filtered in step (b).

22. The method of claim 17, wherein the suspension is filtered in step (b).

23. The method of claim 16, wherein the suspension is filtered in step (b).

24. The method of one of claims 16 to 23 wherein in step c-2-1), the water purification chemicals are added in one of one stage and two stages.

25. The method of claim 16, wherein at the end of step c-2-2), the flocculated pollutants are drained using at least one of pressure draining and centrifugal drainage.

26. The method of claim 16, wherein at the end of step c-2-2), the flocculated pollutants are drained using at least one of pressure and centrifugal drainage.

* * * * *